(12) United States Patent
Ko et al.

(10) Patent No.: US 9,179,408 B2
(45) Date of Patent: Nov. 3, 2015

(54) NEIGHBOR NODE PROBING METHOD USING ADAPTIVE AND ASYNCHRONOUS RENDEZVOUS PROTOCOL IN OPPORTUNISTIC NETWORK AND PORTABLE COMMUNICATION DEVICE USING THE SAME

(71) Applicant: POSTECH ACADEMY-INDUSTRY FOUNDATION, Pohang-si,.Gyungbuk (KR)

(72) Inventors: Hyeon Mok Ko, Pohang-si (KR); Chee Ha Kim, Pohang-si (KR)

(73) Assignee: POSTECH ACADEMY-INDUSTRY FOUNDATION, Pohang-Si, Gyeongsangbuk-Do (KR)

( * ) Notice: Subject to any disclaimer, the term of this patent is extended or adjusted under 35 U.S.C. 154(b) by 269 days.

(21) Appl. No.: 13/859,028

(22) Filed: Apr. 9, 2013

(65) Prior Publication Data
US 2014/0161008 A1   Jun. 12, 2014

(30) Foreign Application Priority Data
Dec. 10, 2012   (KR) .......................... 10-2012-0142993

(51) Int. Cl.
H04W 52/02   (2009.01)
(52) U.S. Cl.
CPC ............ H04W 52/0216 (2013.01); Y02B 60/50 (2013.01)
(58) Field of Classification Search
CPC ................................................ H04W 52/0216
USPC .......................................... 370/311, 337, 347
See application file for complete search history.

(56) References Cited

U.S. PATENT DOCUMENTS

| 2004/0176024 A1* | 9/2004 | Hsu et al. ........................ 455/3.04 |
| 2006/0072520 A1* | 4/2006 | Chitrapu et al. ............... 370/337 |
| 2007/0165593 A1* | 7/2007 | Hundal et al. ................ 370/349 |
| 2009/0086702 A1* | 4/2009 | Julian et al. .................... 370/345 |
| 2009/0125592 A1* | 5/2009 | Hartwich et al. .............. 709/206 |
| 2009/0316624 A1* | 12/2009 | Van Der Wateren .......... 370/328 |
| 2011/0310854 A1* | 12/2011 | Zou et al. ....................... 370/336 |

OTHER PUBLICATIONS

H,. Ko et al., "Adaptive, asynchronous rendezvous protocol for opportunistic networks", Electronics Letters, Apr. 12, 2012, vol. 48, No. 8.

* cited by examiner

*Primary Examiner* — Andrew Lai
*Assistant Examiner* — Andrew C Lee
(74) *Attorney, Agent, or Firm* — Kile Park Reed & Houtteman PLLC

(57) ABSTRACT

Provided is a node probing method using an adaptive and asynchronous rendezvous protocol in an opportunistic network. The node probing method includes: selecting, by each of nodes in the opportunistic network, a prime number larger than two; using, by the node, the selected prime number to generate a wake-up pattern according to the following equation:

$$x_n = \begin{cases} 1, & \text{if } n \equiv 0 (\bmod\ p) \text{ or} \\ & n \equiv 1 (\bmod\ p+1) \\ 0, & \text{others} \end{cases}$$

where Xn=1 represents a wake-up slot, Xn=0 represents a sleeping slot, and 'mod p' represents a modulo operation for the prime number p); and searching, by the node, for a neighbor node according to the generated wake-up pattern.

7 Claims, 3 Drawing Sheets

NEIGHBOR NODE PROBING METHOD USING ADAPTIVE AND ASYNCHRONOUS RENDEZVOUS PROTOCOL IN OPPORTUNISTIC NETWORK AND PORTABLE COMMUNICATION DEVICE USING THE SAME

BACKGROUND OF THE INVENTION

1. Field of the Invention

The present invention relates to a neighbor node probing method which is a necessary process before transmission, and more particularly, to a method for probing a neighbor node using an adaptive and asynchronous rendezvous protocol, when a neighbor node is to be probed before communication is started in an opportunistic network in which the communication is performed only through intermittent connections, and a portable communication device using the same.

2. Description of the Related Art

Recently, much attention has been paid to new types of mobile ad-hoc networks such as opportunistic networks or cognitive networks. Such networks may be applied to various services such as military, vehicle, medical treatment, and multimedia transmission.

In an opportunistic network, nodes require link connection before transmission is started. However, since the mobilities or channel states of the nodes are changed minute by minute, the link connection may be maintained during a very short time.

For link connection, a node must probe a neighbor node within a transmission range thereof. In order to quickly probe a neighbor node, the node may continuously send a probing message. However, since most mobile nodes are operated by a battery, the operation of continuously sending a message requires large energy consumption. Therefore, the operation is almost impossible to be achieved in reality.

Therefore, a rendezvous protocol which is periodically woken up to probe a neighbor node is suitable for energy saving. When a neighbor node is to be probed within a given delay time, energy used for probing the neighbor node must be minimized. In general, as the energy used for probing a neighbor node increases, delay to discovery is reduced.

Furthermore, the rendezvous protocol for the opportunistic network must satisfy the following two conditions. That is, even when probing intervals between nodes are not synchronized (first condition) and even when wake-up patterns are different from each other (second condition), the nodes must be able to successfully probe neighbor nodes through the rendezvous protocol.

The rendezvous protocol operating in such an environment means that each of the nodes may independently perform probing using a wake-up pattern selected by remaining energy thereof or a required delay condition.

In order to satisfy such a request and solve such a problem, a variety of conventional techniques have been proposed. However, the techniques have some limitations in that they may not satisfy the above-described two conditions or may require an excessive number of probing messages or an excessively long probing period.

Representative examples of the conventional techniques may include QUORUM-based rendezvous protocols and DISCO-based rendezvous protocols. FIGS. 1A and 1B are diagrams for explaining QUORUM-based rendezvous protocols and a DISCO-based rendezvous protocol. FIG. 1A illustrates the basic idea of the QUORUM-based rendezvous protocols and the DISCO-based rendezvous protocol. FIG. 1B illustrates wake-patterns of the QUORUM-based rendezvous protocols and the DISCO-based rendezvous protocol on a time axis.

In FIG. 1A, suppose that the QUORUM-based rendezvous protocols share a predefined certain number (n). For example, suppose that all nodes share 4 (n=4).

At this time, one horizontal line and one vertical line are selected from a square table having a size of n×n. That is, one horizontal line and one vertical line are selected from a square table having a size of 4×4. Numbers displayed on the horizontal line and the vertical line selected in such a manner indicate slots which must be woken up. For example, when supposing that a third horizontal line and a fourth vertical line are selected from the 4×4 square table of FIG. 1A, the selected slots correspond to 8, 9, 10, and 11 in the horizontal line and 3, 7, 11, and 15 in the vertical line. That is, third, seventh, eighth, ninth, tenth, 11th, and 15th slots in FIG. 1B must maintain a wake-up and active state. Although different terminals randomly select one horizontal line and one vertical line from the square table having a size of n×n, the terminals have one or more common slots. That is, the different terminals may meet each other at the common slots.

The DISCO protocol is a protocol using the Chinese remainder theorem (CRT), and selects two prime numbers. Referring to FIG. 1A, prime numbers of 3 and 5 are selected, and terminals corresponding to multiples of the respective prime numbers maintain a wake-up and active state. That is, the multiples of 3 are 0, 3, 6, 9, and 12, and the multiples of 5 are 0, 5, and 10. Therefore, as illustrated in FIG. 1B, 0th, third, fifth, sixth, ninth, tenth, and 12th slots maintain a wave-up and active state. Therefore, although two different terminals start the rendezvous protocol at different time points, the DISCO protocol may also guarantee a rendezvous through the CTR.

However, the two rendezvous protocols have a limitation in that they require an excessive number of probing message or an excessively long probing period.

SUMMARY OF THE INVENTION

Accordingly, the present invention has been made in an effort to solve the problems occurring in the related art, and an object of the present invention is to provide a node probing method which is adaptive for an energy state and requirements such as delay, does not require synchronization with neighbor nodes, and is capable of probing a neighbor node through a minimum number of probing messages when neighbor probing is to be performed before communication is started in an opportunistic network in which the communication is performed through intermittent connections.

Another object of the present invention is to provide a mobile communication device using a neighbor node probing method using an adaptive and asynchronous rendezvous protocol in an opportunistic network.

In order to achieve the above object, according to one aspect of the present invention, there is provided a node probing method using an adaptive and asynchronous rendezvous protocol in an opportunistic network. The node probing method includes: selecting, by each of nodes in the opportunistic network, a prime number larger than two; using, by the node, the selected prime number to generate a wake-up pattern according to the following equation:

$$Xn = \begin{cases} 1, & \text{if } 0 = (n \bmod p) \text{ or} \\ & 1 = (n \bmod (p+1)) \\ 0, & \text{if } 0 \ne (n \bmod p) \text{ and} \\ & 1 \ne (n \bmod (p+1)) \end{cases}$$

where Xn=1 represents a wake-up slot, Xn=0 represents a sleeping slot, and 'mod p' represents a modulo operation for the prime number p); and searching, by the node, for a neighbor node according to the generated wake-up pattern.

When two nodes use the same wake-up pattern and select a prime number p, the neighbor node probing may be performed within (p×[p/2]) slots where [p/2] represents an integer quotient obtained by dividing the prime number p by 2.

When two nodes select different prime numbers p1 and p2 and use different wake-up patterns, the neighbor node probing may be performed within (p1×p2) slots.

The nodes may probe neighbor nodes at asynchronous intervals. Furthermore, the nodes may receive power through a battery.

According to another embodiment of the present invention, there is a mobile communication device that probes a neighbor node using an adaptive and asynchronous rendezvous protocol in an opportunistic network. The mobile communication device includes: a wake-up pattern generation unit configured to select a prime number p larger than two and generate a wake-up pattern using the following equation:

$$Xn = \begin{cases} 1, & \text{if } 0 = (n \bmod p) \text{ or} \\ & 1 = (n \bmod (p+1)) \\ 0, & \text{if } 0 \ne (n \bmod p) \text{ and} \\ & 1 \ne (n \bmod (p+1)) \end{cases}$$

where Xn=1 represents a wake-up slot, Xn=0 represents a sleeping slot, and 'mod p' represents a modulo operation for the prime number p); and a node probing unit configured to probe a neighbor node according to the generated wake-up pattern.

According to another embodiment of the present invention, there is provided a mobile communication device that probes a neighbor node using an adaptive and asynchronous rendezvous protocol in an opportunistic network. The mobile communication device includes: a display unit; one or more processors; a memory; and one or more programs, wherein the one or more programs are stored in the memory and configured to be executed by the one or more processors, and the program includes: a command for selecting a prime number larger than two and generating a wake-up pattern using the following equation:

$$Xn = \begin{cases} 1, & \text{if } 0 = (n \bmod p) \text{ or} \\ & 1 = (n \bmod (p+1)) \\ 0, & \text{if } 0 \ne (n \bmod p) \text{ and} \\ & 1 \ne (n \bmod (p+1)) \end{cases}$$

where Xn=1 represents a wake-up slot, Xn=0 represents a sleeping slot, and 'mod p' represents a modulo operation for the prime number p); and a command for probing a neighbor node according to the generated wake-up pattern.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
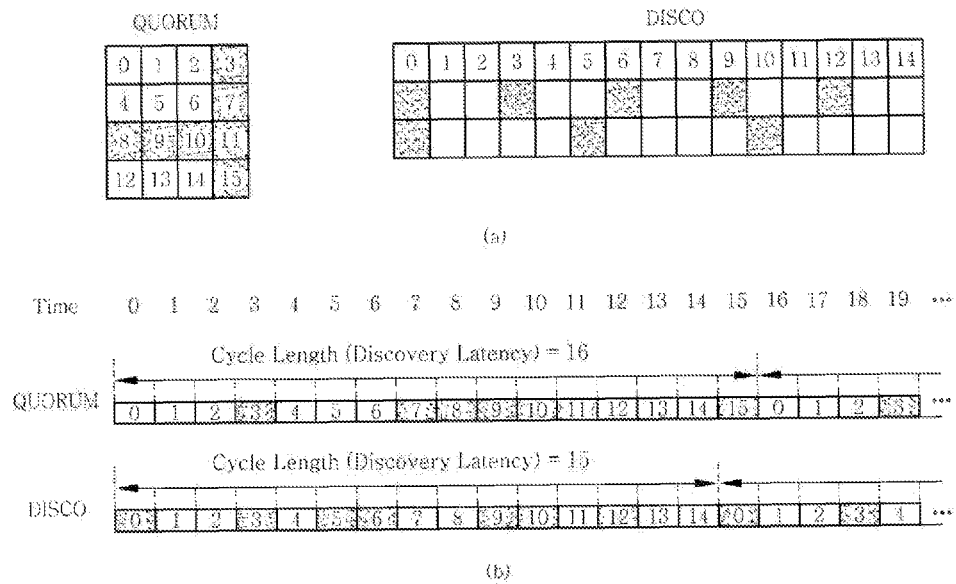
FIG. 1A illustrates the basic idea of QUORUM-based rendezvous protocols and a DISCO-based rendezvous protocol.
FIG. 1B illustrates wake-patterns of the QUORUM-based rendezvous protocols and the DISCO-based rendezvous protocol on a time axis.

Reference will now be made in greater detail to a preferred embodiment of the invention, an example of which is illustrated in the accompanying drawings. Wherever possible, the same reference numerals will be used throughout the drawings and the description to refer to the same or like parts.

An adaptive and asynchronous rendezvous protocol for opportunistic networks used in the present invention uses a prime number to generate a wake-up pattern. When a given prime number is p, a duty cycle length L of the corresponding wake-up pattern is defined by multiplying the prime number p by a quotient obtained by dividing the prime number p by 2 as expressed by Equation 1.

$$L = p \times [p/2] \qquad \text{[Equation 1]}$$

Here, [p/2] represents an integer indicating a quotient obtained by dividing p by 2, and a remainder is discarded. For example, when p is 5, [p/2] becomes 2, and when p is 11, [p/2] becomes 5.

Meanwhile, a wake-up pattern of a node A is represented by $X_n^A$ (n<L). At this time, $X_n^A=1$ indicates that the node A is woken up to search for a neighbor node at a slot n and is probing a neighbor node in an active state, and $X_n^A=0$ indicates that the node A is sleeping to save energy at the slot n. The wave-up pattern using the prime number p is defined as expressed by Equation 2.

$$Xn = \begin{cases} 1, & \text{if } 0 = (n \bmod p) \text{ or} \\ & 1 = (n \bmod (p+1)) \\ 0, & \text{if } 0 \neq (n \bmod p) \text{ and} \\ & 1 \neq (n \bmod (p+1)) \end{cases} \quad \text{[Equation 2]}$$

Here, Xn=1 represents an awoken slot, Xn=0 represents a sleeping slot, n represents an n-bit slot in a node, and 'mod p' represents a modulo operation for the prime number p.

At this time, when nodes A and B use the same wake-up pattern, the corresponding rendezvous protocol guarantees not more than p×[p/2] slots as discovery latency, and when supposing that the nodes A and B use different wake-up patterns, the corresponding rendezvous protocol guarantees not more than p1×p2 slots as discovery latency.

Figure 2:
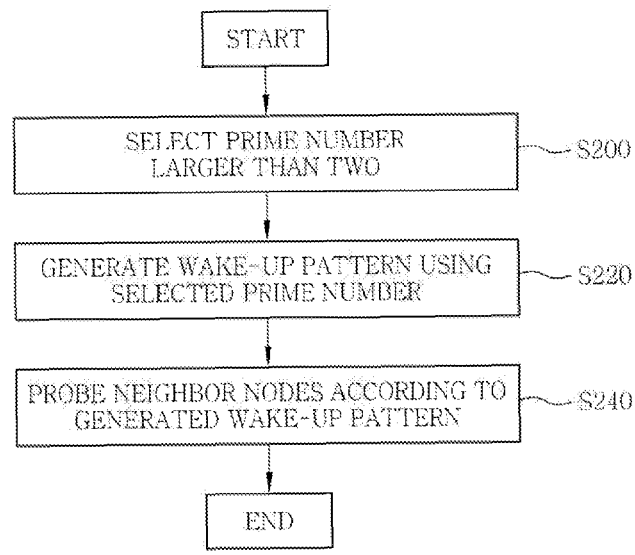
FIG. 2 is a flowchart showing a neighbor node probing method using an adaptive and asynchronous rendezvous protocol in an opportunistic network according to an embodiment of the present invention.

FIG. 2 is a flowchart showing a neighbor node probing method using an adaptive and asynchronous rendezvous protocol in an opportunistic network according to the embodiment of the present invention. Referring to FIG. 2, each of nodes in the opportunistic network selects a prime number p larger than 2 at step S200. Then, the node uses the selected prime number to generate a wake-up pattern according to Equation 2, at step S220. Then, the node probes a neighbor node according to the generated wake-up pattern at step S240.

When two nodes use the same wake-up pattern and select a prime number p, the neighbor node probing is performed within p×[p/2] slots where [p/2] represents a quotient obtained by dividing the prime number p by 2. When two nodes select different prime numbers p1 and p2 and use different wake-up patterns, the neighbor node probing is performed within p1×p2 slots. The nodes probe neighbor nodes at asynchronous intervals, and receive power through a battery.

Figure 3:
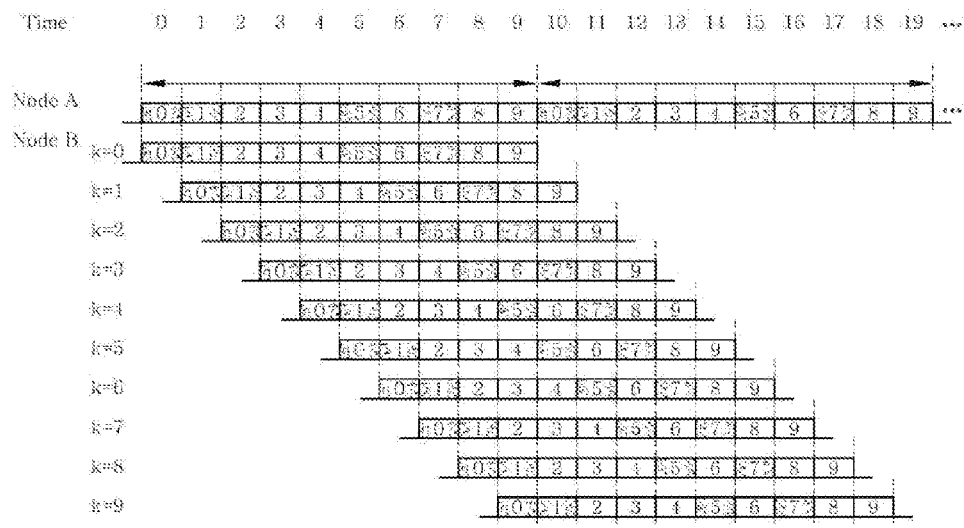
FIG. 3 illustrates that when nodes A and B select the same prime number p of 5, the nodes A and B have the same wake-up pattern, and neighbor probing may be performed within given discovery latency (10 slots)

FIG. 3 illustrates that when nodes A and B select the same prime number p of 5, the nodes A and B have the same wake-up pattern, and neighbor probing may be performed within given discovery latency (10 slots).

First, when p=5, the duty cycle length L of the corresponding wake-up pattern becomes 10 (L=5×[5/2]=5×2) according to Equation 1. That is, 10 slots including 0th to ninth slots are set to the cycle length.

At this time, since the nodes A and B use the same wake-up pattern, the rendezvous protocol guarantees discovery latency corresponding to not more than 10 slots (5×[5/2]=5×2).

When Equation 2 is applied at p=5, slots are set as follows. At a 0th slot, 0 mod 5=0 and $X_n$=1. Thus, the 0th slot is a wake-up slot. At a first slot, 1 mod 5=1 and $X_n$=1. Thus, the first slot is a wake-up slot. At a second slot, 2 mod 5=2, 2 mode (5+1)=2, and $X_n$=0. Thus, the second slot is a sleeping slot. At a third slot, 3 mod 5=3, 3 mod (5+1)=3, and $X_n$=0. Thus, the third slot is a sleeping slot. Similarly, Equation 2 may also be applied to fourth to ninth slots. As a result, the 0th, first, fifth, and seventh slots correspond to wake-up slots and the second, third, fourth, sixth, eighth, and ninth slots correspond to sleeping slots.

In FIG. 3, the 0th, first, fifth, and seventh slots of the node A are indicated by gray. The gray slots are wake-up slots which perform neighbor node probing. The second, third, fourth, sixth, eighth, and ninth slots indicated by white are sleeping slots which do not probe neighbor nodes.

Furthermore, k represents a misalignment distance, and FIG. 3 illustrates that the node B started to perform neighbor probing later by k than the node A.

When k=0, the nodes A and B are always woken up at the same slots. When k=1, the nodes A and B are simultaneously woken up at the first slot of the node A and the 0th slot of the node B. Therefore, the nodes A and B may recognize the existence thereof by exchanging probing messages.

Similarly, when k=2, the nodes A and B are simultaneously woken up at the seventh slot of the node A and the fifth slot of the node B. Therefore, the nodes A and B may recognize the existence thereof by exchanging probing messages. When k=3, the nodes A and B are simultaneously woken up at the 0th slot of the node A and the seventh slot of the node B. Therefore, the nodes A and B may recognize the existence thereof by exchanging probing messages. When k=4, the nodes A and B are simultaneously woken up at the fifth slot of the node A and the first slot of the node B and at the first slot of the node A and the seventh slot of the node B. Therefore, the nodes A and B may recognize the existence thereof by exchanging probing messages. When k=5, the nodes A and B are simultaneously woken up at the fifth slot of the node A and the 0th slot of the node B and at the 0th slot of the node A and the fifth slot of the node B. Therefore, the nodes A and B may recognize the existence thereof by exchanging probing messages.

When k=6, the nodes A and B are simultaneously woken up at the seventh slot of the node A and the first slot of the node B and at the first slot of the node A and the fifth slot of the node B. Therefore, the nodes A and B may recognize the existence thereof by exchanging probing messages. When k=7, the nodes A and B are simultaneously woken up at the seventh slot of the node A and the 0th slot of the node B. Therefore, neighbor probing may be performed.

When k=8, the nodes A and B are simultaneously woken up at the fifth slot of the node A and the seventh slot of the node B. Therefore, neighbor probing may be performed. When k=9, the nodes A and B are simultaneously woken up at the 0th slot of the node A and the first slot of the node B. Therefore, neighbor probing may be performed.

Figure 4:
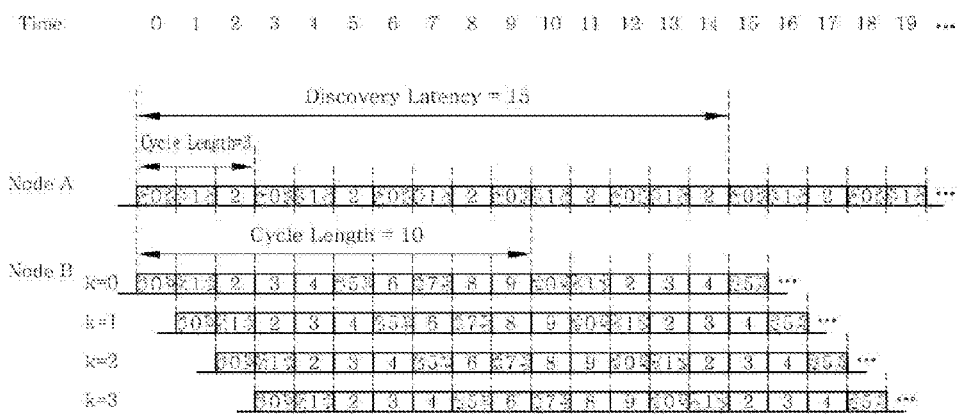
FIG. 4 illustrates a case in which the nodes A and B select different prime numbers, and when the node A selects a prime number 3 and the node B selects a prime number 5, the nodes A and B have different wake-up patterns, and neighbor probing may be performed within given latency (15 slots)

FIG. 4 illustrates a case in which the nodes A and B select different prime numbers. When the node A selects a prime number 3 and the node B selects a prime number 5, the nodes A and B have different wake-up patterns. At this time, neighbor probing may be performed within given latency (15 slots).

First, when p=3, the duty cycle length L of the corresponding wake-up pattern becomes 3 (3×[3/2]=3×1) according to Equation 1. That is, three slots including 0th to second slots become the cycle length.

Referring to FIG. 4, when Equation 2 is applied at p=3, slots may be set as follows. At a 0th slot, 0 mod 3=0 and Xn=1. Thus, the 0th slot is a wake-up slot. At a first slot, 1 mod 3=1 and Xn=1. Thus, the first slot is a wake-up slot. At a second slot, 2 mod 3=2, 2 mod (3+1)=2, and Xn=0. Thus, the second slot is a sleeping slot. Therefore, the 0th and first slots are wake-up slots, and the second slot is a sleeping slot.

Furthermore, when Equation 2 is applied at p=5, slots may be set as follows. At the 0th slot, 0 mod 5=0 and Xn=1. Thus, the 0th slot is a wake-up slot. At the first slot, 1 mod 5=1 and Xn=1. Thus, the first slot is a wake-up slot. At the second slot, 2 mod 5=2, 2 mod (5+1)=2, and Xn=0. Thus, the second slot is a sleeping slot. At the third slot, 3 mod 5=3, 3 mod (5+1)=3, and Xn=0. Thus, the second slot is a sleeping slot. Equation 2 may be applied to sixth to ninth slots in the same manner. As a result, the 0th, first, fifth, and seventh slots correspond to wake-up slots, and the second, third, fourth, sixth, eighth, and ninth slots correspond to sleeping slots.

Therefore, the rendezvous protocol according to the embodiment of the present invention guarantees discovery latency corresponding to not more than 15 slots (3×5), because the nodes A and B use different wake-up patterns.

Referring to FIG. 4, the 0th and first slots of the node A are wake-up slots indicated by gray, the 0th, first, fifth, and seventh slots of the node B are wake-up slots indicated by gray, and the discovery latency indicates not more than 15 slots. Furthermore, k represents a misalignment distance, and FIG. 3 illustrates that the node B started to perform node probing later by k than the node A.

When k=0, the nodes A and B are simultaneously woken up at the 0th and first slots of the node A and the 0th and first slots of the node B, at the first slot of the node A and the seventh slot of the node B, and at the first slot of the node A and the 0th slot of the node B. Therefore, the nodes A and B may recognize the existence thereof by exchanging probing messages.

When k=1, the nodes A and B are simultaneously woken up at the first slot of the node A and the 0th slot of the node B, at the 0th slot of the node A and the fifth slot of the node B, and at the 0th slot of the node A and the first slot of the node B. Therefore, the nodes A and B may recognize the existence thereof by exchanging probing messages.

When k=2, the nodes A and B are simultaneously woken up at the 0th slot of the node A and the first slot of the node B, at the first slot of the node A and the fifth slot of the node B, at the 0th slot of the node A and the 0th slot of the node B, and at the first slot of the node A and the first slot of the node B. Therefore, the nodes A and B may recognize the existence of the nodes by exchanging probing messages.

Figure 5:
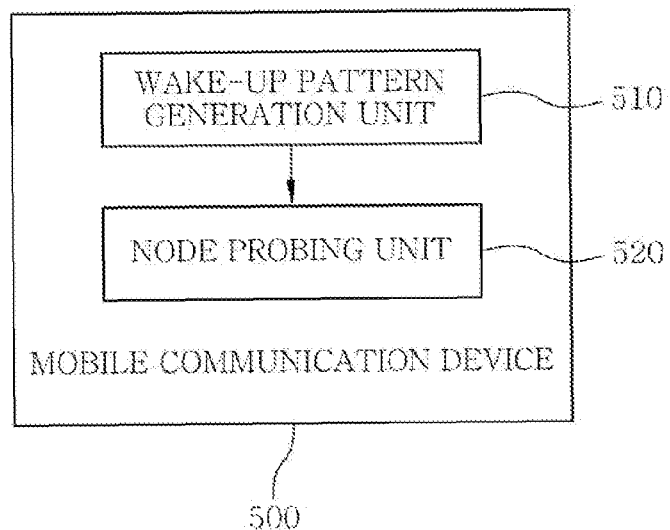
FIG. 5 is a block diagram of a mobile communication device which probes a neighbor node in an opportunistic network according to an embodiment of the present invention.

Meanwhile, FIG. 5 is a block diagram of a mobile communication device which probes a neighbor node in an opportunistic network according to an embodiment of the present invention. The mobile communication device includes a wake-up pattern generation unit 510 and a node probing unit 520.

The wake-up pattern generation unit 510 is configured to select a prime number p larger than 2 and generate a wake-up pattern using Equation 2, in the mobile communication device 500 which probes a neighbor node in an opportunistic network. The node probing unit 520 is configured to probe a neighbor node according to the generated wake-up pattern. When the wake-up pattern generation unit 510 generates a wake-up pattern, the node probing unit 520 performs node probing using the generated wake-up pattern. At this time, since the generation of the wake-up pattern by the wake-up pattern generation unit 510 has been already described in the method for probing a neighbor node in an opportunistic network, the detailed descriptions thereof are omitted herein.

Figure 6:
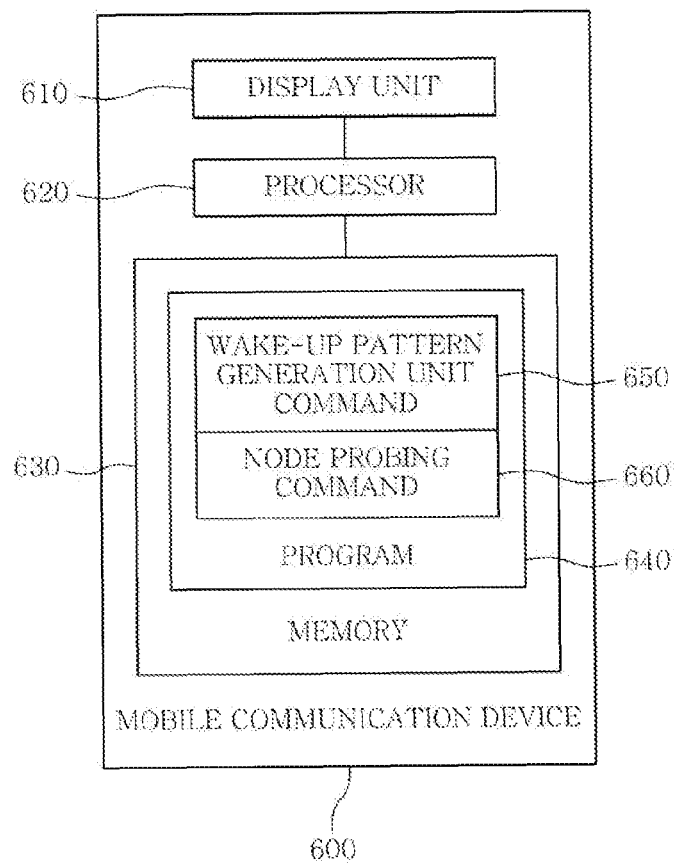
FIG. 6 is a block diagram of a mobile communication device which probes a neighbor node in an opportunistic network according to another embodiment of the present invention.

FIG. 6 is a block diagram of a mobile communication device which probes a neighbor node in an opportunistic network according to another embodiment of the present invention. The mobile communication device 600 includes a display unit 610, one or more processors 620, a memory 630, and one or more programs 640. The one or more programs 640 are stored in the memory 630, and configured to be executed by the one or more processors 620. The program 640 includes a command 650 for selecting a prime number p larger than 2 and generating a wake-up pattern using Equation 2 and a command 660 for probing a neighbor node according to the generated wake-up pattern.

For reference, when the wake-up pattern is generated according to Equation 2, the rendezvous protocol guarantees discovery latency corresponding to not more than $p \times [p/2]$ slots in case where the nodes A and B use the same wake-up pattern, and guarantees discovery latency corresponding to not more than $p1 \times p2$ slots in case where the nodes A and B use different wake-up patterns. This may be proved as follows.

[Proof]

Suppose that the misalignment distance between the nodes A and B is set to k and the node A starts a probing operation before the node B.

First, in a symmetrical case, k may be expressed as one of the following values:

$k = i + p \times j$, $k = ([p/2] + i) + p \times j$, and $k = p \times j$.

Here, $1 \leq i \leq p2$, $0 \leq j \leq (p2-1)$, and $k < L$.

Suppose that a rendezvous slot number of the node A is m. Then, a rendezvous slot number of the node B is (m−k).

When $k = i + p \times j$, $m = (p+1) \times (i-1) + 1$. That is because $X^A_m = 1$ for $\{(p+1) \times (i-1) + 1\}$ mod $(p+1) = 1$, and $X^B_{m-k} = 1$ for $\{(p+1) \times (i-1) + 1 - i - p \times j\}$ mod $p = p \times (i-j-1)$ mod $p = 0$ by Equation 2.

Therefore, the range of a rendezvous time is decided as $p \times [p/2]$. That is because m−k $(= p \times (i-j-1)) = p \times ([p/2]-1) = p \times [p/2]$ slots.

When $k = ([p/2] + i) + p \times j$, $m = p([p/2] - i + j)$. That is because $X^A_m = 1$ for $p(p2 - i + j)$ mod $p = 0$, and $X^B_{m-k} = 1$ for $\{p([p/2] - i + j) - ([p/2] + p \times j + i)\}$ mod $(p+1) = \{p([p/2] - i) [p/2] + 1 - i\}$ mod $(P+1) = \{p \times [(p+1)/2] - p \times i[(p+1)/2] + 1 - i)\}$ mod $(p+1) = \{(p+1)((p/2) - (½) - i) + i\}$ mod $(p+1) = \{(p+1)([p/2] - i) + 1)\}$ mod $(p+1) = 1$ by Equation 2.

Therefore, the rendezvous time is decided as $p \times [p/2]$. That is because m−k $(= (p+1)([p/2] - i) + 1) = p \times [p/2][p/2] = p \times [p/2]$ slots.

When $k = p \times j$, $m = p \times j$. That is because $X^A_m = 1$ for $p \times j$ mod $p = 0$, and $X^B_{m-k} = 1$ for $(p \times j - p \times j)$ mod $p = 0$ by Equation 2.

Therefore, the rendezvous time is decided as $p \times [p/2]$. That is because m−k $(= p \times j - p \times j) = p \times P2$ slots.

Next, in an asymmetrical case where the node A selects a prime number p1 and the node B selects a prime number p2, k may be expressed as one of the following values:

$k = p1 \times j$, and $k < p1$ for $j = 0$.

When $k = p1 \times j$, the proof is trivial.

When $k < p1$, $m (= k + p1 \times p2)$ may be always obtained so that $m = 0$ (mod p1) and $m - k = 0$ (mod p2) according to the CRT. That is because $\gcd(p1, p2) = 1$.

Therefore, the rendezvous time of (m−k) slots is decided as $p1 \times p2$.

According to the neighbor node probing method using an adaptive and asynchronous rendezvous protocol in an opportunistic network, when neighbor probing is to be performed before communication is started in an opportunistic network in which the communication is to be performed through intermittent connections, the neighbor node probing method is adaptive for the energy state and requirements such as delay, does not require synchronization with neighbor nodes, and may probe neighbor nodes through a minimum number of probing messages, thereby saving energy during the neighboring node probing.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A node probing method using an adaptive and asynchronous rendezvous protocol in an opportunistic network, comprising:

selecting, by each of nodes in the opportunistic network, a prime number larger than two;

using, by the node, the selected prime number to generate a wake-up pattern according to the following equation:

$$Xn = \begin{cases} 1, & \text{if } 0 = (n \bmod p) \text{ or} \\ & 1 = (n \bmod (p+1)) \\ 0, & \text{if } 0 \neq (n \bmod p) \text{ and} \\ & 1 \neq (n \bmod (p+1)) \end{cases}$$

where n represents an n-bit slot in a node, Xn=1 represents a wake-up slot, Xn=0 represents a sleeping slot, and 'mod p' represents a modulo operation for the prime number p; and searching, by the node, for a neighbor node according to the generated wake-up pattern.

2. The node probing method of claim 1, wherein when two nodes use the same wake-up pattern and select a prime number p, the neighbor node probing is performed within (p×[p/2]) slots where [p/2] represents an integer quotient obtained by dividing the prime number p by 2.

3. The node probing method of claim 1, wherein when two nodes select different prime numbers p1 and p2 and use different wake-up patterns, the neighbor node probing is performed within (p1×p2) slots.

4. The node probing method of claim 1, wherein the nodes probe neighbor nodes at asynchronous intervals.

5. The node probing method of claim 1, wherein the nodes receive power through a battery.

6. A mobile communication device that probes a neighbor node using an adaptive and asynchronous rendezvous protocol in an opportunistic network, the mobile communication device comprising:

a wake-up pattern generation unit configured to select a prime number p larger than two and generate a wake-up pattern using the following equation:

$$Xn = \begin{cases} 1, & \text{if } 0 = (n \bmod p) \text{ or} \\ & 1 = (n \bmod (p+1)) \\ 0, & \text{if } 0 \neq (n \bmod p) \text{ and} \\ & 1 \neq (n \bmod (p+1)) \end{cases}$$

where n represents an n-bit slot in a node, Xn=1 represents a wake-up slot, Xn=0 represents a sleeping slot, and 'mod p' represents a modulo operation for the prime number p; and a node probing unit configured to probe a neighbor node according to the generated wake-up pattern.

7. A mobile communication device that probes a neighbor node using an adaptive and asynchronous rendezvous protocol in an opportunistic network, the mobile communication device comprising:

a display unit;
one or more processors;
a memory; and
one or more programs,
wherein the one or more programs are stored in the memory and configured to be executed by the one or more processors, and
the program comprises:
a command for selecting a prime number larger than two and generating a wake-up pattern using the following equation:

$$Xn = \begin{cases} 1, & \text{if } 0 = (n \bmod p) \text{ or} \\ & 1 = (n \bmod (p+1)) \\ 0, & \text{if } 0 \neq (n \bmod p) \text{ and} \\ & 1 \neq (n \bmod (p+1)) \end{cases}$$

where n represents an n-bit slot in a node, Xn=1 represents a wake-up slot, Xn=0 represents a sleeping slot, and 'mod p' represents a modulo operation for the prime number p; and a command for probing a neighbor node according to the generated wake-up pattern.

\* \* \* \* \*